(12) United States Patent
Shin et al.

(10) Patent No.: US 7,834,496 B2
(45) Date of Patent: Nov. 16, 2010

(54) MOTOR

(75) Inventors: Sung Yong Shin, Jeonbuk (KR); Jeong Uk Byun, Busan (KR); Sung Jung Kim, Gimhae-si (KR)

(73) Assignee: LG Electronics Inc., Seoul (KR)

( * ) Notice: Subject to any disclaimer, the term of this patent is extended or adjusted under 35 U.S.C. 154(b) by 497 days.

(21) Appl. No.: 11/723,700

(22) Filed: Mar. 21, 2007

(65) Prior Publication Data
US 2008/0129131 A1 Jun. 5, 2008

(30) Foreign Application Priority Data

| Dec. 1, 2006 | (KR) | ................... 10-2006-0120657 |
| Dec. 1, 2006 | (KR) | ................... 10-2006-0120658 |
| Dec. 1, 2006 | (KR) | ................... 10-2006-0120659 |

(51) Int. Cl.
H02K 11/00 (2006.01)

(52) U.S. Cl. .................. 310/71; 310/43; 310/219; 310/191; 310/266

(58) Field of Classification Search .......... 310/71, 310/266, 219, 43, 191; H02K 11/00
See application file for complete search history.

(56) References Cited

U.S. PATENT DOCUMENTS

| 5,782,652 | A * | 7/1998 | Feher et al. ................ 439/417 |
| 7,141,900 | B2 * | 11/2006 | Nakamura et al. ........ 310/68 D |
| 2002/0047365 | A1 * | 4/2002 | Yagyu et al. ................ 310/71 |
| 2002/0050751 | A1 * | 5/2002 | Hashimoto et al. ........... 310/71 |
| 2005/0275297 | A1 * | 12/2005 | Suzuki et al. ................ 310/71 |
| 2006/0022550 | A1 * | 2/2006 | Otsuji ....................... 310/216 |
| 2006/0202587 | A1 * | 9/2006 | Agematsu .................. 310/257 |
| 2007/0236099 | A1 * | 10/2007 | Kim et al. .................. 310/266 |
| 2007/0285852 | A1 * | 12/2007 | Gupta ........................ 361/38 |
| 2008/0122300 | A1 * | 5/2008 | Cho et al. .................... 310/43 |
| 2008/0265691 | A1 * | 10/2008 | Shikayama et al. .......... 310/12 |

FOREIGN PATENT DOCUMENTS

| CN | 1405951 | 3/2003 |
| EP | 1 541 738 | 6/2005 |
| GB | 2 412 015 | 9/2005 |
| JP | 62-119156 | 7/1987 |
| JP | 05-003653 | 1/1993 |
| JP | 2001-025183 | 1/2001 |
| JP | 2003-134712 | 5/2003 |
| JP | 2005-237110 | 9/2005 |
| KR | 10-1998-0069372 | 10/1998 |
| KR | 10-2000-0028839 | 5/2000 |
| KR | 10-2005-0052010 | 6/2005 |

* cited by examiner

*Primary Examiner*—Quyen Leung
*Assistant Examiner*—Terrance Kenerly
(74) *Attorney, Agent, or Firm*—McKenna Long & Aldridge LLP

(57) ABSTRACT

The motor including a stator having a stator core, and an insulator provided to the stator core for winding a coil thereon, a rotor rotatably provided with respect to the stator, and a tap terminal provided to the insulator for positioning an end of the coil, wherein the coil includes a core wire of aluminum.

11 Claims, 11 Drawing Sheets

MOTOR

This application claims the benefit of the Patent Korean Application Nos. 10-2006-0120657, 0120658, and 0120659, all of which were filed on Dec. 1, 2006, and are hereby incorporated by reference as if fully set forth herein.

BACKGROUND OF THE INVENTION

1. Field of the Invention

The present invention relates to motors, and more particularly, to a motor which reduces production costs and can enhance productivity and reliability.

2. Discussion of the Related Art

In general, a motor transmits rotating force of a rotor to a rotating shaft which drives a load. For example, the rotating shaft can drive a drum of a washing machine, or a refrigerator fan connected thereto for supplying cold air to a required space.

Also, inside the motor the rotor rotates in an electromagnetic interaction with a stator. For this, the stator has coils wound thereon and, upon application of a current, the rotor rotates with respect to the stator.

Typically, the coil is formed of copper because copper has good electric conductivity, and good ductility that is good for winding. However, the high costs of copper tends to increase the cost of the motor. Moreover, because of the a lack of a stable supply of the raw material which is used to produce copper, international demands for copper occasionally rise sharply.

Therefore, it is required to use a coil made from another material besides copper in order to reduce the production cost of the motor while maintaining the quality of a motor manufactured with copper.

SUMMARY OF THE INVENTION

Accordingly, the present invention is directed to a motor that substantially obviates one or more of the problems due to limitations and disadvantages of the related art.

An advantage of the present invention is that the cost of a coil in a motor can be reduced and to provide a motor that may reduce the production cost of a motor on the whole.

Another advantage of the present invention is to provide a motor that is easy to fabricate, enhances reliability, and has a long lifetime Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a motor includes: a stator having a stator core; an insulator attached to the stator core for winding a coil thereon; a rotor; and a tap terminal provided on an the insulator for positioning an end of the coil, wherein the coil winding around the stator core is aluminum.

In another aspect of the present invention, a motor includes: an insulator provided on a stator core for winding a coil of aluminum core wire thereon; a tap terminal provided to the insulator for positioning an end of the coil thereto; a magmate placed in the tap terminal to connect to the coil electrically and fasten the coil to the tap terminal; and an insulating portion formed at an exposed core wire portion of the coil.

In yet another aspect of the present invention, a motor includes: a stator having a stator core; an insulator provided to the stator core for winding a coil thereon; a rotor attached to the stator, wherein the rotor has a plurality of permanent magnets; and a tap terminal attached to the insulator for positioning an end of the coil, wherein the end of the coil is fastened to the tap terminal such that a core wire of aluminum and resin is coated on the tap terminal.

It is to be understood that both the foregoing general description and the following detailed description are exemplary and explanatory and should not be construed as limiting the scope of the claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

A structure of a motor in accordance with a preferred embodiment of the present invention will be described with reference to FIGS. 1 and 2.

Figure 1:
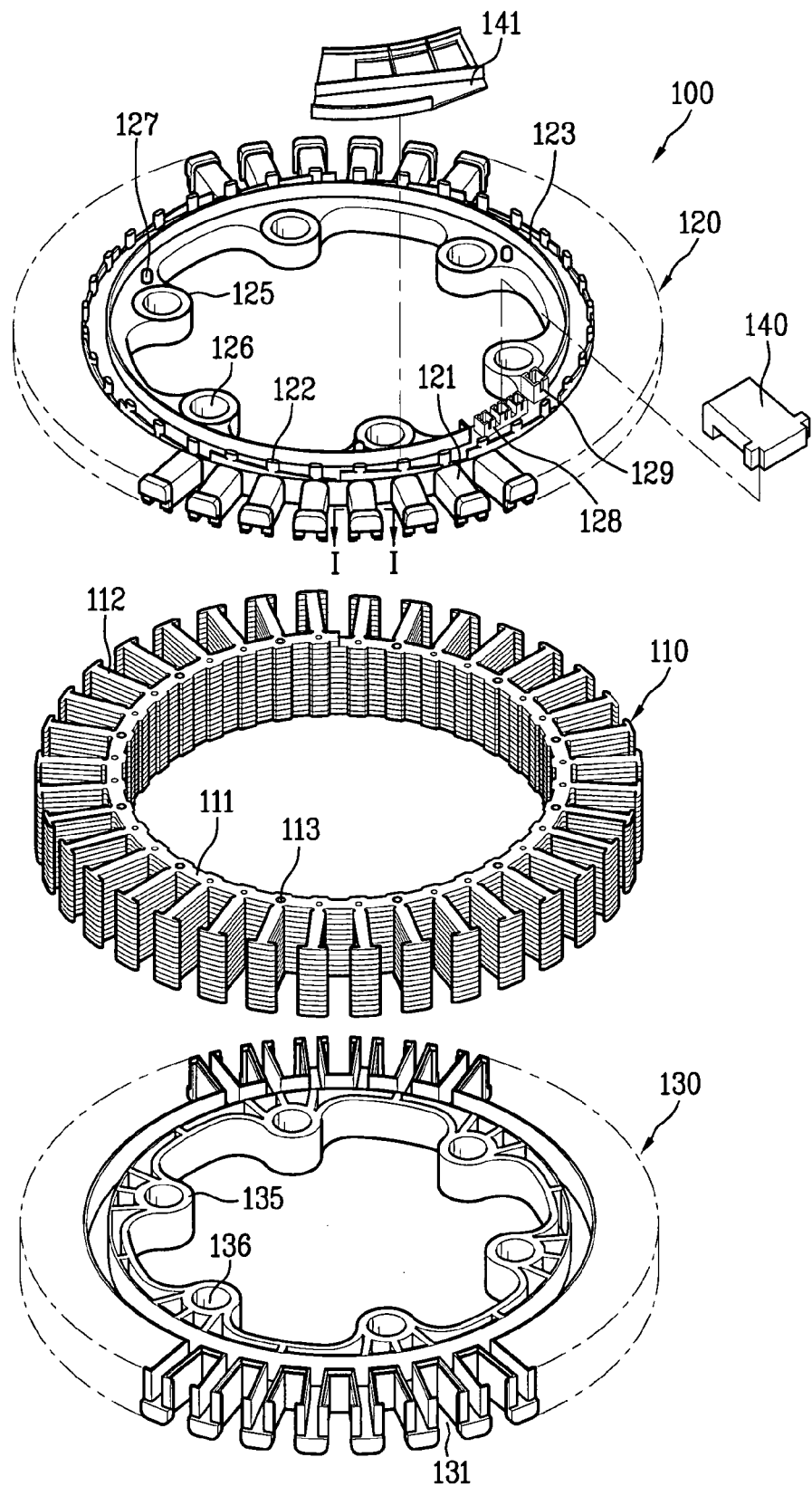
FIG. 1 is an exploded perspective view illustrating a stator of a motor in accordance with a preferred embodiment of the present invention.

FIG. 1 is an exploded perspective view illustrating a stator of a motor in accordance with an embodiment of the present invention.

Referring to FIG. 1, the stator 100 includes a stator core 110, an upper insulator 120, and a lower insulator 130.

The stator core 110 has an annular back yoke 111 and T-shaped projections 112 each projected outward in a radial direction from an outside circumference of the back yoke 111. FIG. 1 illustrates a stator 100 of an outer rotor type motor having a rotor provided to an outer side of the stator core. Accordingly, the T-shaped projections 112 may be projected inwardly in a radial direction from an inside circumference of the back yoke. In this case, the stator 100 will be a stator of an inner rotor type motor.

The stator core 110 may be constructed of steel plates punched and stacked. Accordingly, it is preferable that a band of back yoke with T-shaped projections 112 projecting from the back yoke in a vertical direction is stacked while bending the band of the back yoke in a spiral to form a spiral core. The spiral core is illustrated in FIG. 1.

The annular back yoke 111 stacked has caulking portions 113 for joining layers of the stack together as one unit to form a stator core.

Each of the T-shaped projections 112 has a coil (not shown) wound thereon. However, since the T-shaped projections 112 are generally conductive, an insulator is provided between each of the T-shaped projections 112 and the coil. Accordingly, the present invention provides insulators 120 and 130 on a top and a bottom of the stator core 110. That is, an upper insulator 120 and a lower insulator 130 are mounted on the stator core 110 to enclose the stator core 110. In this instance, the coil is wound on a winding portion 121 and 131 that encloses each of the T-shaped projections 112.

However, different from FIG. 1, the insulators 120 and 130 may be formed as one unit with the stator core 110. For an example, the stator core 110 may be molded as one unit with the insulators.

Also, on the inside of the insulators 120 and 130, there are fastening bosses 125, and 135 projected in a radial direction, each with a fastening hole 126 or 136 for positioning and securing the stator 100 to a rear wall (not shown) of the drum type washing machine. Of course, the fastening bosses 125 and 135 are not necessarily secured to the tub, but to a bracket (not shown) or a motor housing (not shown) that may be an exterior of the motor.

That is, the fastening hole 126 in the upper insulator and the fastening hole 136 in the lower insulator 130 are matched to each other to form one hole at the time of assembly of the upper insulator 120, the stator core 110, and the lower insulator 130. By placing a bolt (not shown) or the like through the hole, an entire stator 100 can be fixedly secured to a tub.

Moreover, a positioning projection 127 may be formed adjacent to the fastening hole 126 in the upper insulator 120. That is, after positioning the stator 100 by placing the positioning projection 127 in a hole (not shown) in a tub, the stator 100 may be secured with the bolt.

The stator of FIG. 1 may have coils for u, v, and w phases wound thereon. One coil may be wound on one of the T-shaped projections so that each of the T-shaped projections 112 has one polarity. This is called as a concentrated winding. Ash the number of the polarities increases, the slower the maximum rotating speed of the rotor. Accordingly, control of the motor is easy, and the maximum torque also becomes relatively greater.

Once a winding of a u phase coil on the one of the T-shaped projections is complete, the coil is wound on a coil winding rib 122 and secured thereto. The coil is wound on every third adjacent one of the T-shaped projections 112 again. A starting end and a final end of the coil are positioned at a power connection tap terminal 128, and a neutral point tap terminal 129.

The power connection tap terminal 128 has a connector 140 connected thereto for applying a three phased power to the u, v, and w phases of coils, respectively. Along with this, the final points of the three phase coils are connected to the neutral point tap terminal 129 together electrically, to form a neutral point.

In this instance, it is preferable that an outside of the tap terminal 128, or 129 is formed of an insulating material, preferably as one unit with the insulator.

Also, on one side of the tap terminals, i.e., the power connection tap terminal 128 and the neutral point tap terminal 129, there is a hole sensor assembly 141 secured thereto. By means of the hole sensor assembly, the position and/or a speed of the rotor is sensed, to regulate a phase of a voltage and the intensity of a current applied thereto for controlling a rotating speed and a torque of the rotor.

On the inside of a radial direction of the coil winding rib 122, there is an insulator rib 123 formed along a circumferential direction. Of course, the insulator rib 123 is formed not only for the upper insulator 120, but also for the lower insulator 130. The insulator rib 123 has a predetermined height for cutting off the flow of water from inside of the insulator toward the winding portion 121, and 131.

Moreover, it is preferable that the insulator rib 123 has a height higher than that of the coil. Because the coil is susceptible to damage by things around the coil in handling the stator 100. That is, if the stator is placed on a floor, damage to the coil may be prevented because only the insulator rib 123 is in contact with the floor, but not the coil.

Figure 2:
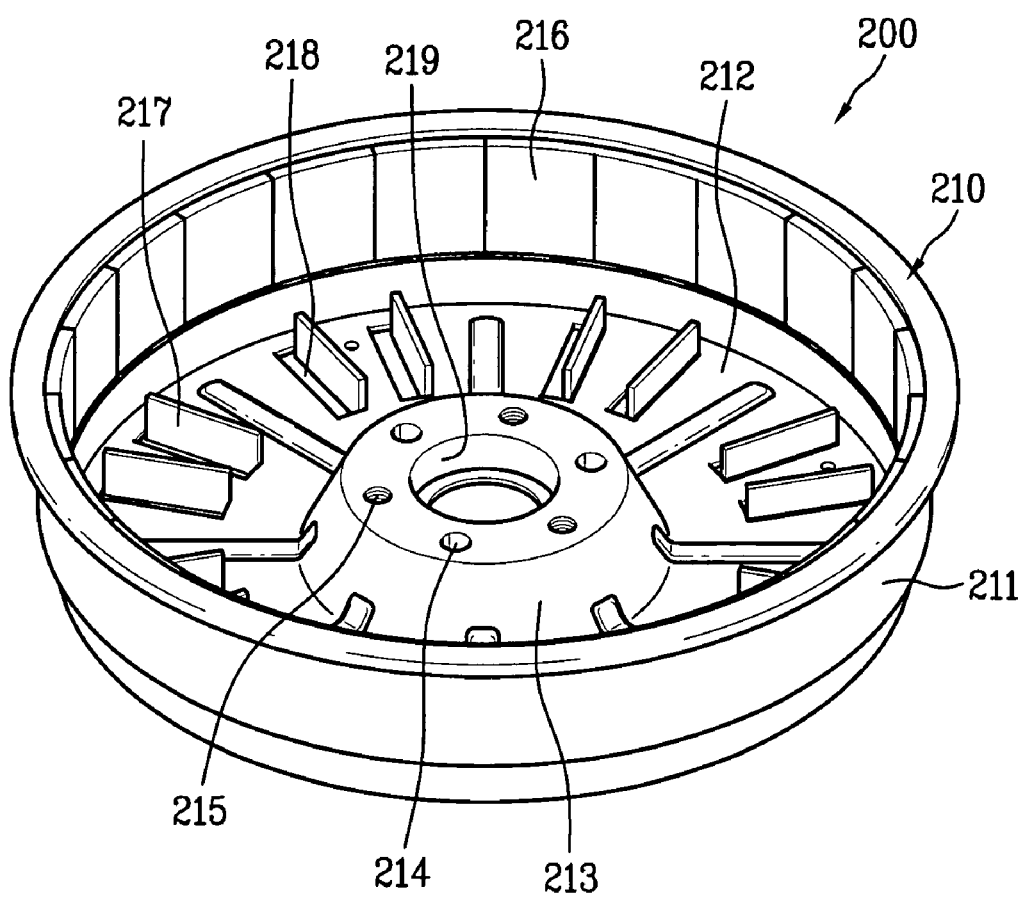
FIG. 2 is a perspective view illustrating a rotor of a motor in accordance with a preferred embodiment of the present invention.

FIG. 2 is a perspective view illustrating a rotor of a motor in accordance with a preferred embodiment of the present invention.

The rotor 200 includes a rotor frame 210 and permanent magnets 216. The rotor frame 210 includes a base 212 and a sidewall 211 on an outer side of the base, that may be formed by the process of pressing a steel plate. At the inside of the sidewall, there are a plurality of permanent magnets 216 provided along a circumferential direction. The permanent magnets 216 are magnetized as N poles and S poles alternately along the circumferential direction.

The sidewall 211 serves as a back yoke that forms a magnetic path.

Also, the rotor frame 210 may be injection molded, so an annular magnetic back yoke is required to be provided separately.

Moreover, at a central portion of the base 212, there is a hub portion 213 protruding upward reinforcing rigidity of the base. The hub portion 213 has a pass through hole at a center, where a rotating shaft (not shown) is positioned, for example, a rotating shaft of the washing machine. The rotating shaft and the hub portion 213 are coupled with connectors (not shown). Accordingly, as the rotor 200 rotates, the rotating force of the rotor is transmitted to the rotating shaft.

Moreover, the hub portion 213 may have fastening holes 214 for fastening the connectors thereto, or positioning holes 215 for positioning the connector to position the connector at first.

The rotor 200 has the stator 100 placed therein, so that the rotor 200 rotates with respect to the stator 100 by interaction with the stator 100. The rotation force of the rotor is transmitted to the rotating shaft (not shown) coupled thereto and rotated as one unit with the rotor frame 210.

The present invention is drawn to a motor using a core wire of aluminum. It is well known in the art that aluminum has an inside resistance greater than that of copper. Therefore, in order to reduce the inside resistance, it is required to increase an outside diameter compared to the conventional copper coil.

Also, it is well known in the art that aluminum has ductility lower than copper, and is susceptible to breakage by an external impact. Also, aluminum is susceptible to water, particularly, salt water, such that contact with salt water can cause the aluminum wire to corrode.

Therefore, in the motor of the present invention, it is preferable that the coil of aluminum has a double coated film applied to an outside of the core wire of aluminum for reinforcing strength and ductility of the aluminum coil. As a result of the double coated film, reliability of insulation of the coil can be further enhanced.

As described above, the coils terminate at the tap terminals 128 or 129. It is preferred that the ends of the coil has the coated film removed therefrom for exposing the core wire for electrical connection. Therefore, as described before, the end portions of the coil having the core wire exposed thus are susceptible to breakage due to weak strength and ductility.

Therefore, the present invention discloses an insulating portion for the end portions of the coil, that reinforces the strength of the coil, prevents corrosion, and provides insulation. The insulating portion is described in detail with reference to FIGS. 3 to 7.

Figure 3:
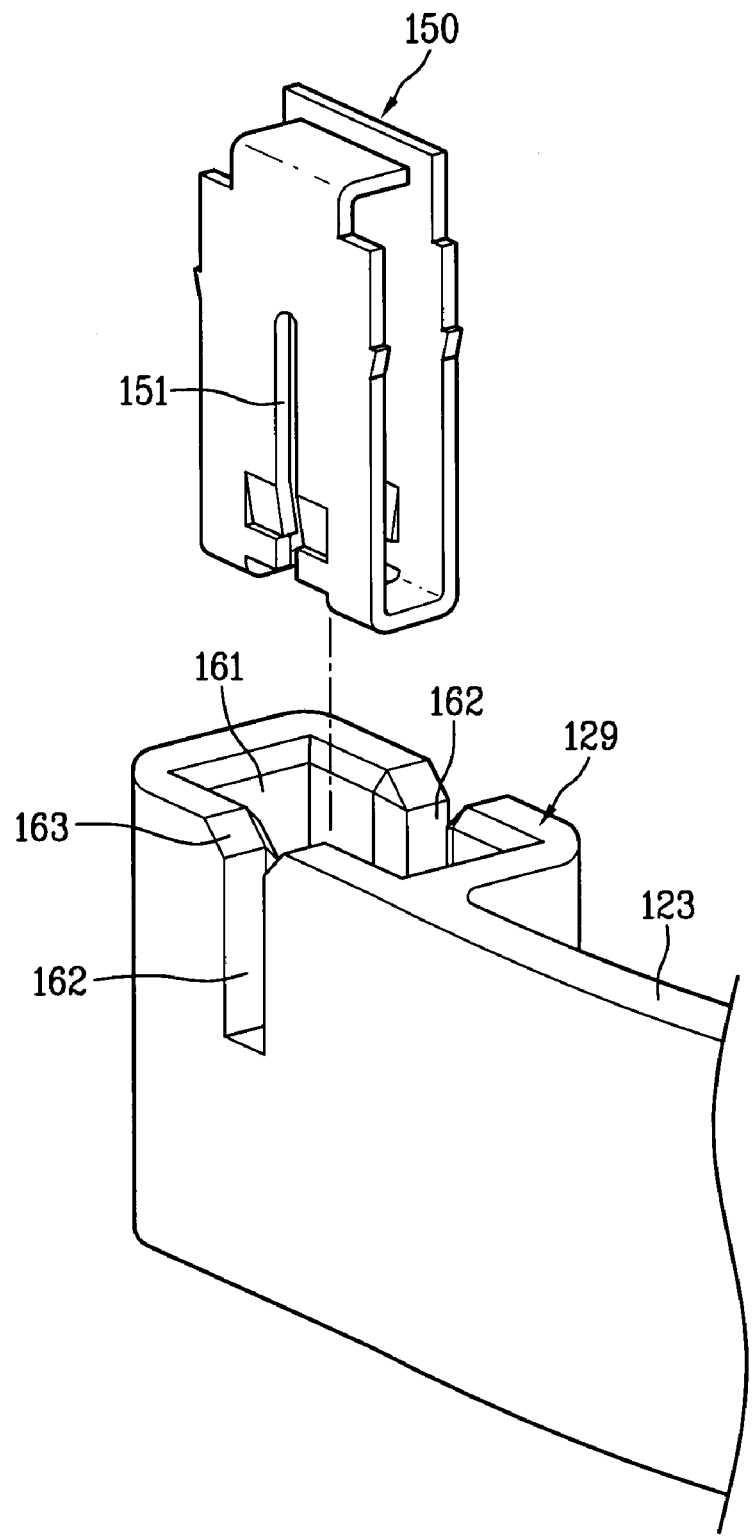
FIG. 3 is a disassembled perspective view of a tap terminal and a magnet.
Figure 4:
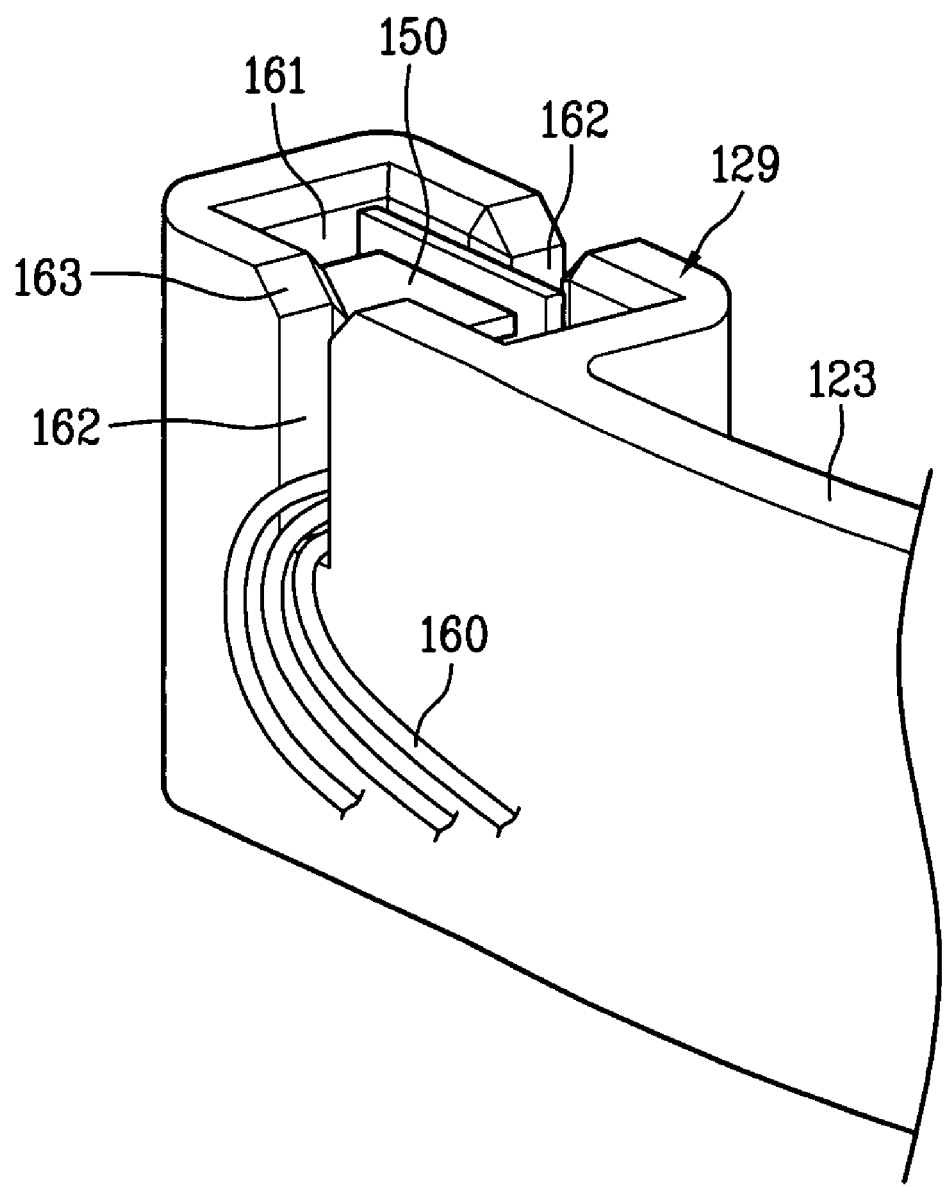
FIG. 4 is an assembled perspective view of a tap terminal, a coil, and a magnet.

FIG. 3 is a disassembled perspective view of a tap terminal and a magmate to be placed in the tap terminal, and FIG. 4 is an assembled perspective view of an end of coil placed in a tap terminal, such that the end of the coil is connected to the tap terminal through the magnet.

The tap terminal may be the power connection tap terminal 128 or the neutral point tap terminal 129. However, for convenience sake, only the neutral point will be described, and one of ordinary skill in the art can appreciate the description below is equally applicable to the power connection tap terminal 128.

Referring to FIGS. 3 and 4, the tap terminal has a space 161 formed therein for placing the magmate 150 therein. Together with this, the space has a slot 162 on in front and rear, for holding the end portion of the coil. It is preferable that upper corners of the slots 162 are chamfered 163 or rounded for easy placing of the coil in the slots 162.

In the meantime, the tap terminal may have one side connected to the insulator rib 123 described before.

Referring to FIG. 3, the magmate 150 has a ' ⊏ ' shape with a slot in each of a front and a rear. It is preferable that a width of the slot 151 is in conformity with a thickness of the core of the coil. That is, it is preferable that the core of the coil is fit in the slot 151 in order to be electrically connected to the magmate 150. Therefore, it is required that the magmate is formed of an electrically conductive material.

As described above, the electrical connection between the magmate 150 and the end of the coil as the end of the coil is found in the slot 162 of the tap terminal. The magmate 150 is placed in the space 161 of the tap terminal, with the core wire exposed.

FIG. 4 illustrates a state where both the end of the coil and the magmate 150 are placed in the tap terminal, to form a neutral point terminal 129.

Figure 5:
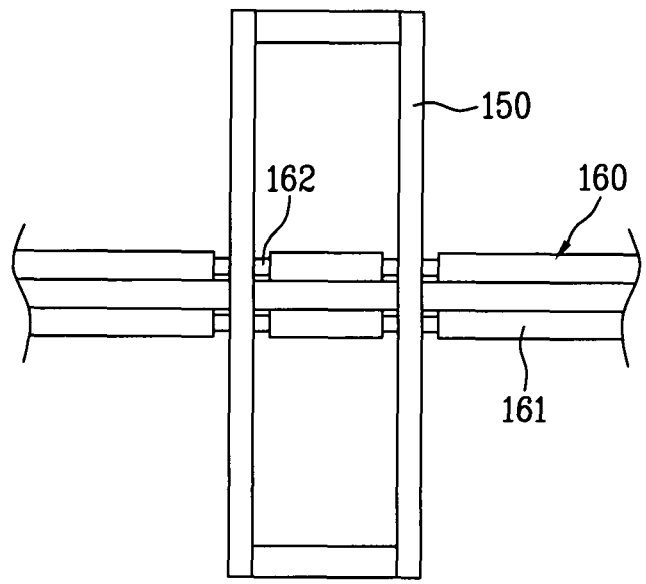
FIG. 5 illustrates the coil and the magmate in FIG. 4 put together, schematically.
Figure 6:
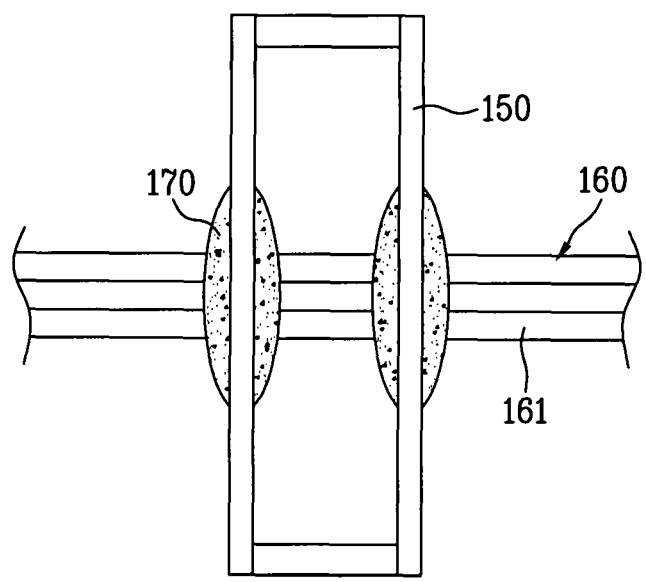
FIG. 6 illustrates a state in which an insulating portion is at a portion the coil and the magmate in FIG. 4 are put together, schematically.

FIGS. 5 and 6 illustrate electrical connection between the magmate 150 and the end of the coil, schematically.

The magmate 150 and the end of the coil 160 are connected to each other electrically as the core wire 162 of the coil is in contact with the conductive magmate 150. It is preferable that a portion where the core wire 162 of the coil and the magmate 150 are in contact has an insulation portion formed thereon. An example of such an insulation portion is shown in FIG. 6 as a resin 170 which is coated on the core wire 162 and magmate 150. Magmate is well known flexible magnet which is used electrical applications.

The resin 170 is an insulating material, so that the resin 170 is set after being coated to maintain insulation of the core wire 162, and protects the core wire 162 from outside impact. The resin 170 shields direct transmission of an external force onto the core wire 161, and as a result, reinforces the strength of the core wire 161.

Figure 7:
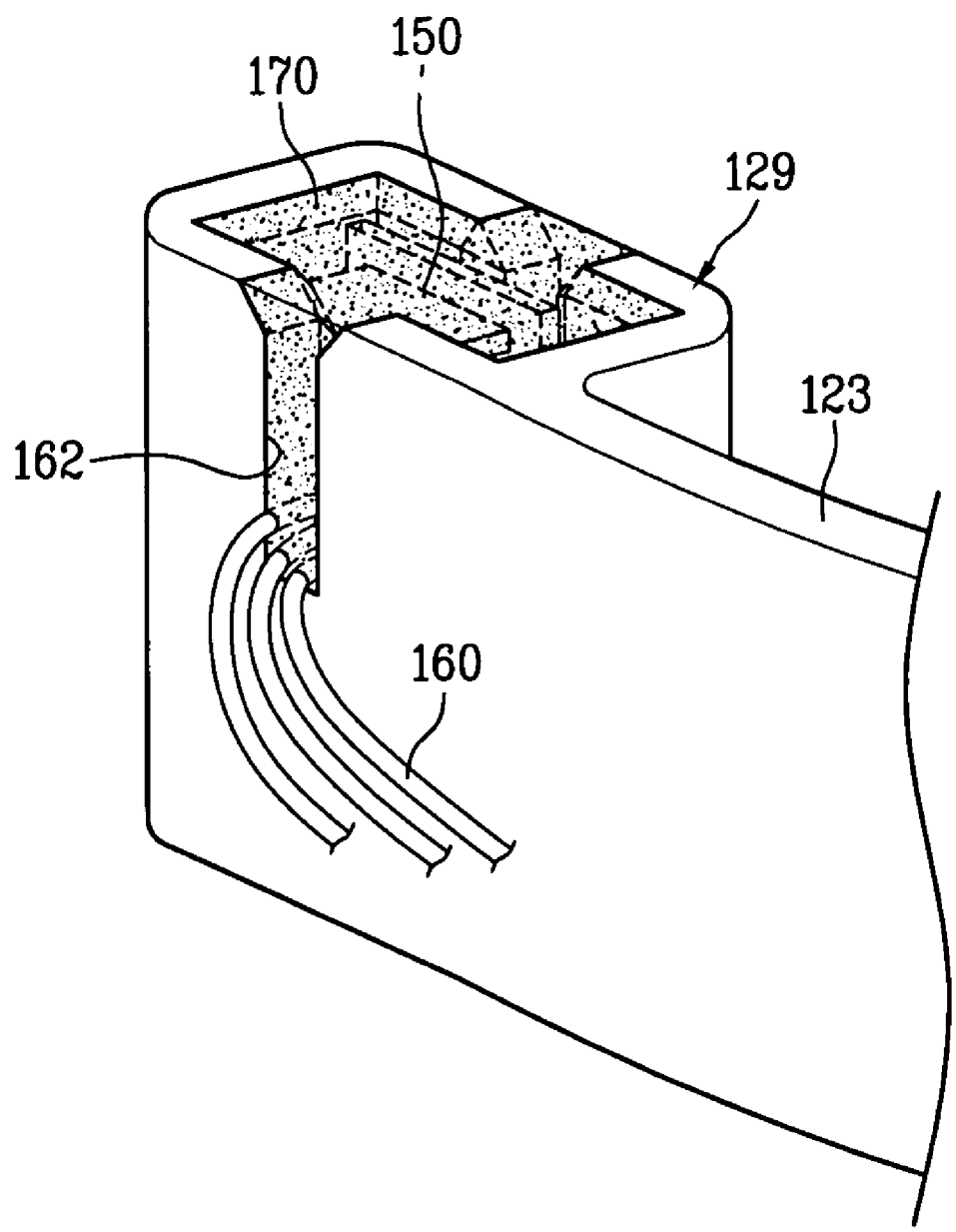
FIG. 7 is a perspective view illustrating an insulating portion in accordance with a preferred embodiment of the present invention.

FIG. 7 illustrates the resin 170 coated throughout the tap terminal. That is, resin 170 is coated not only on the magmate 150 and the exposed portion of the core wire 162 of the coil, but also on a portion of the coil 160 having no coated film 161 removed therefrom.

The resin 170 provides a firmer securing of the end of the coil to the tap terminal, and more reliable insulation and prevention of corrosion.

If the tap terminal is the power connection tap terminal 128, it is required that the magmate 150 is connected to a power source (not shown). Therefore, for such a connection, it is preferable that at least a portion of the power connection tap terminal 128 has no resin 170 coated thereon.

Another embodiment of the insulation portion will be described in detail with reference to FIG. 8.

In the foregoing embodiment, the insulation portion for reinforcing, insulation, and corrosion prevention of the exposed portion of the core wire includes a resin coating.

In this embodiment of the invention, the insulation portion may include the resin. However, the embodiment enables the insulation portion to have the foregoing function even if the resin is removed.

A coil slipping preventive structure in accordance with a preferred embodiment of the present invention will be described in detail with reference to FIGS. 10 and 11.

In general, the coil is wound on the T-shaped projections 112, not directly thereon, but on a winding portion 121, or 131 of the insulator on each of the T-shaped projections.

Moreover, the coil is wound, not in a single layer, but in a plurality of layers. For an example, in the case of the motor for a washing machine, the coil may be wound in four layers. Accordingly, a total height of an ideally wound layers will be four times of an outside diameter of the coil. However, if the coil in a lower layer slips, the coil in an overlying layer can be depressed, or opposite to this, projected. Therefore, the projected coil makes the total height of wound layers higher, allowing damage to the projected coil during handling.

Therefore, it is preferable that the projection of the coil is minimized, for which prevention of slipping of the coil is important.

The maximum number of turns of the coil that may be wound on the winding portion 121 or 131 is fixed according to a length of the winding portion and the outside diameter of the coil. For an example, if the length L of the winding portion is 20 mm, and an outside diameter of the coil is 0.95 mm, a possible number of turns are 20.

Figure 10:
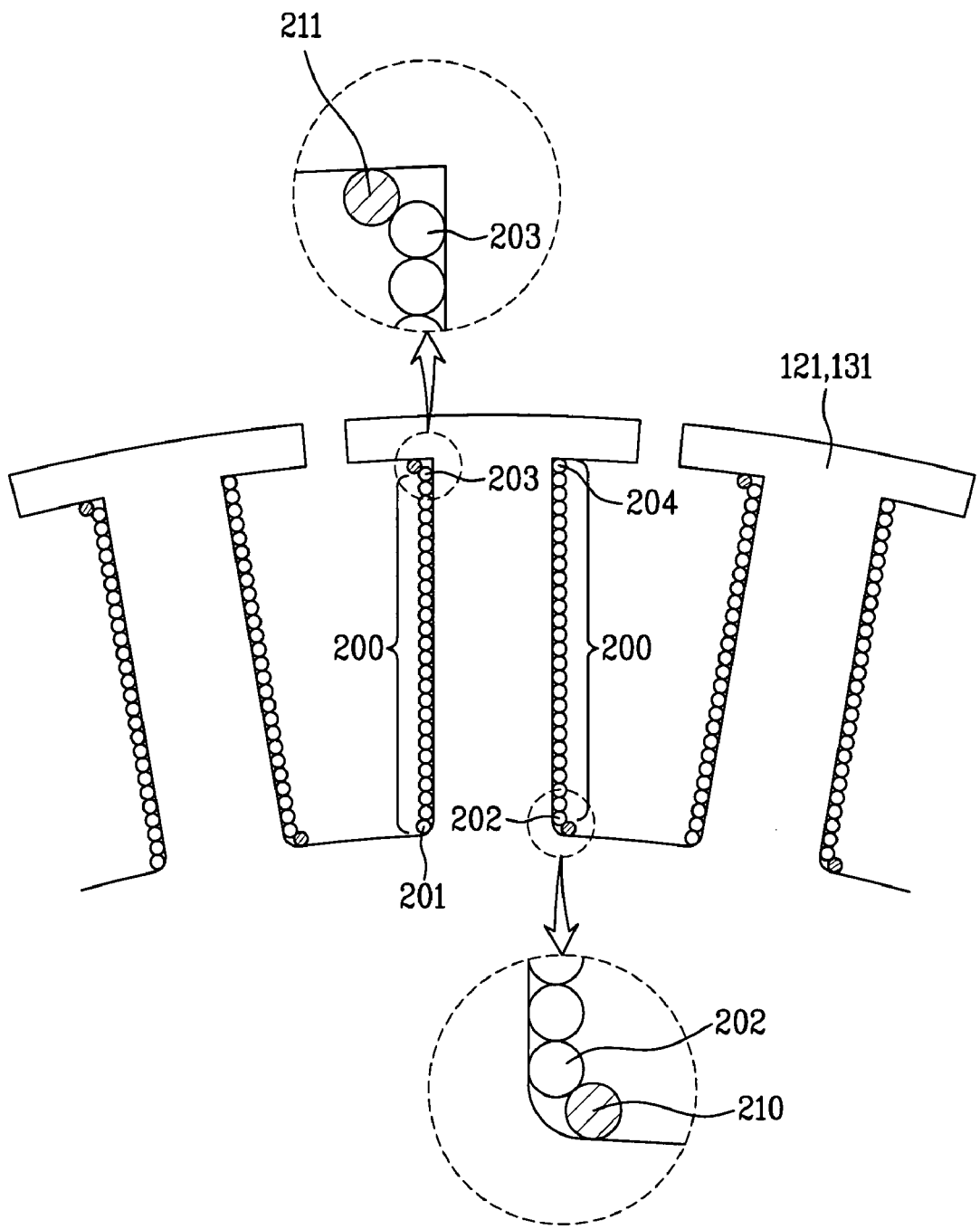
FIG. 10 is a partial plane view illustrating a coil slipping preventive structure in accordance with a preferred embodiment of the present invention.

A type of winding done by such a method is shown in a reference numeral 200 in FIG. 10.

Also, each of a starting end of the winding portion and a final end of a winding portion, i.e., each of opposite ends of the winding portion has a gap. The gap will be smaller than the outside diameter of the coil. Accordingly, the coil wound on the gap pushes the other coil wound, to form the gap between, not the opposite ends of the winding portion, but coils at the other portion of the winding portion, resulting in defective winding.

Therefore, it is important to prevent the slipping of the coils from taking place, for which it is required to fill the gaps at the opposite ends of the winding portion.

For this, one turn is added forcibly to each of the gaps for preventing the slipping of the coil with the additional windings 210, and 211.

That is, the winding starts from a coil 201 and a coil 202, until coil 203 and coil 204, and then on a T. In this case, as described before, for an example, 21 turns are made.

However, the present invention suggests including an additional turn thereto forcibly by means of coils 210 and 211. The coils 210 and 211 fill the gaps at the opposite ends of the winding portion, respectively. According to this, because the coils fall in for themselves, they prevent the slipping from taking place.

It is preferable that the additional one turn is formed on an opposite side of a portion the winding starts and on an opposite side of a portion the winding ends. That is, a ½ turn from the coil 201 to the coil 202 and a ½ turn from the coil 204 to the coil 211 are added forcibly to add one turn forcibly.

In the meantime, a first coil layer is formed by such a forced winding. Then, because a winding path of a next coil layer is formed by the coil in the first coil layer, the slipping of coil is prevented at the overlying layer, too. That is, because the coil has a circular section, a fixed path is formed between adjacent coils, following which path, the coil is wound again. In the meantime, as described before, because the slipping of coil is prevented even if the coil is wound on such a path, collapse of the coil layer is prevented.

Along with this, it is preferable that the additional one turn is formed only in the first layer, but not in layers over the first layer. That is, because the additional one turn is projected higher than other coils, the coils at opposite ends of the winding portion will be projected higher than other coils if winding is made on the projected portion again.

An insulating portion of a motor in accordance with a second embodiment of the present invention will be described with reference to FIGS. 8 and 9.

Figure 8:
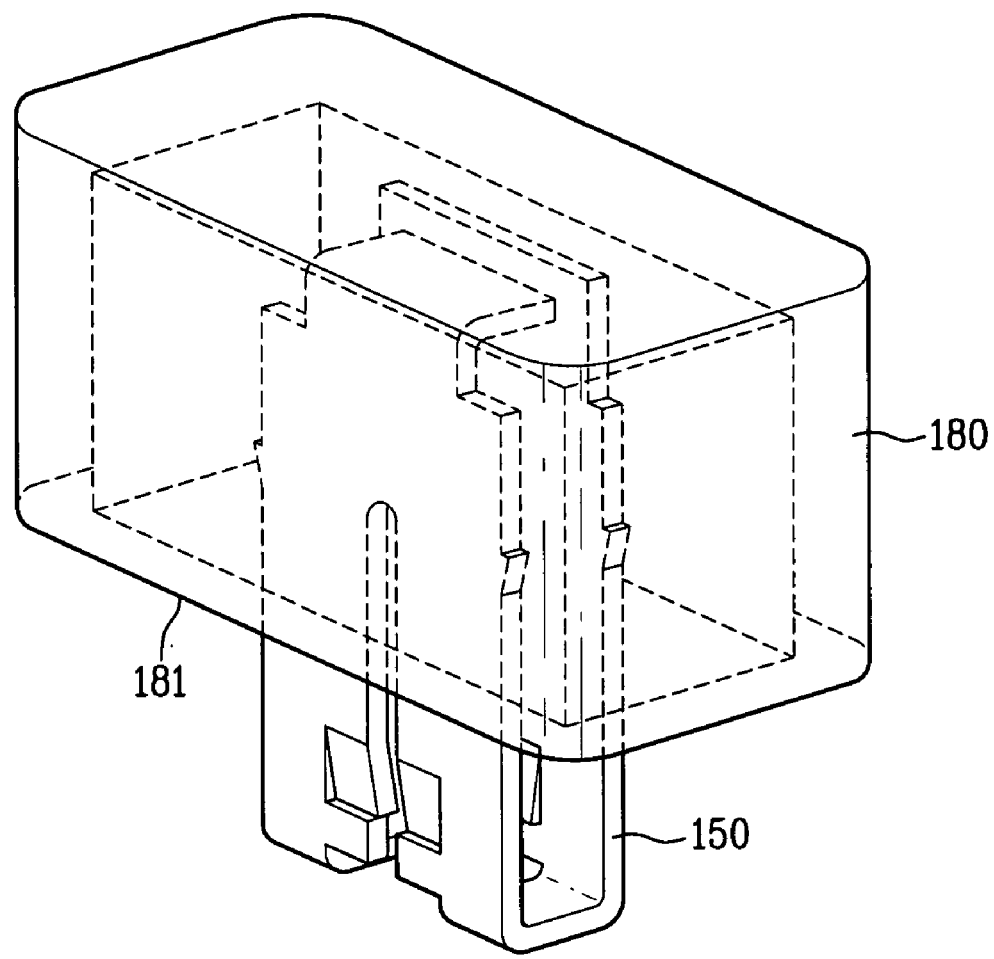
FIG. 8 is a perspective view illustrating a tap terminal cover in accordance with a preferred embodiment of the present invention.

FIG. 8 is a perspective view illustrating a tap terminal cover 180 as the insulation portion in accordance with second preferred embodiment of the present invention.

The tap terminal cover 180 is capped on the tap terminal to receive the tap terminal. That is, the tap terminal cover 180 covers an exterior of the tap terminal enough to isolate the tap terminal.

Accordingly, even if there is an exposed portion of the core wire 162, the exposed portion is made to be present only within the tap terminal, such that the tap terminal is isolated, enabling the tap terminal to perform functions of insulating the exposed portion of the core wire and preventing the exposed portion of the core wire from corroding.

The tap terminal cover 180 in FIG. 8 can be capped on the tap terminal having the magmate 150 and the coil with exposed core wire placed therein. In this instance, a portion of the coil without exposed core wire positioned in the slot 162 is pressed by a bottom portion 181 of the tap terminal. Accordingly, an external impact is transmitted, not to the exposed portion of the core wire directly, but only to a coil portion positioned in the slot, preventing cutting of the core wire portion.

Also, it is preferable that the tap terminal cover 180 caps the tap terminal deeper than the slot 162 of the tap terminal. That is, it is preferable that, when the tap terminal cover caps the tap terminal completely, the bottom portion 181 of the tap terminal cover is positioned over the slot 162 by a predetermined height, for preventing water from entering thereto through the slot 160 in advance.

Referring to FIG. 8, the tap terminal cover 180 may be fabricated as a unit separate from the magmate 150; also the tap terminal cover 180 may be fabricated as a unit with the magmate 150. That is, the magmate 150 is placed in the tap terminal cover 180, and the tap terminal is placed in the tap terminal cover 180, enabling electric connection and formation of the insulating portion at the tap terminal with one work.

For example, while the tap terminal is formed of a conductive material, the tap terminal cover may be formed of an insulating material, i.e., one selected from a group of resins. Therefore, if the tap terminal is inserted in the tap terminal cover at the time of injection molding of the tap terminal cover, both the tap terminal and the tap terminal cover may be fabricated as one unit.

The tap terminal cover 180 serves to isolate the magmate 150 from an outside thereof completely, to insulate the magmate 150, causing a problem that the magmate 150 is difficult to be electrically connected to other portions excluding the coil. Accordingly, though it is preferable that the tap terminal is applied to the tap terminal cover 180 and the neutral point tap terminal 129, one of ordinary skill in the art would recognize otherwise.

An insulating portion in accordance with third preferred embodiment of the present invention will be described in detail with reference to FIG. 9.

Figure 9:
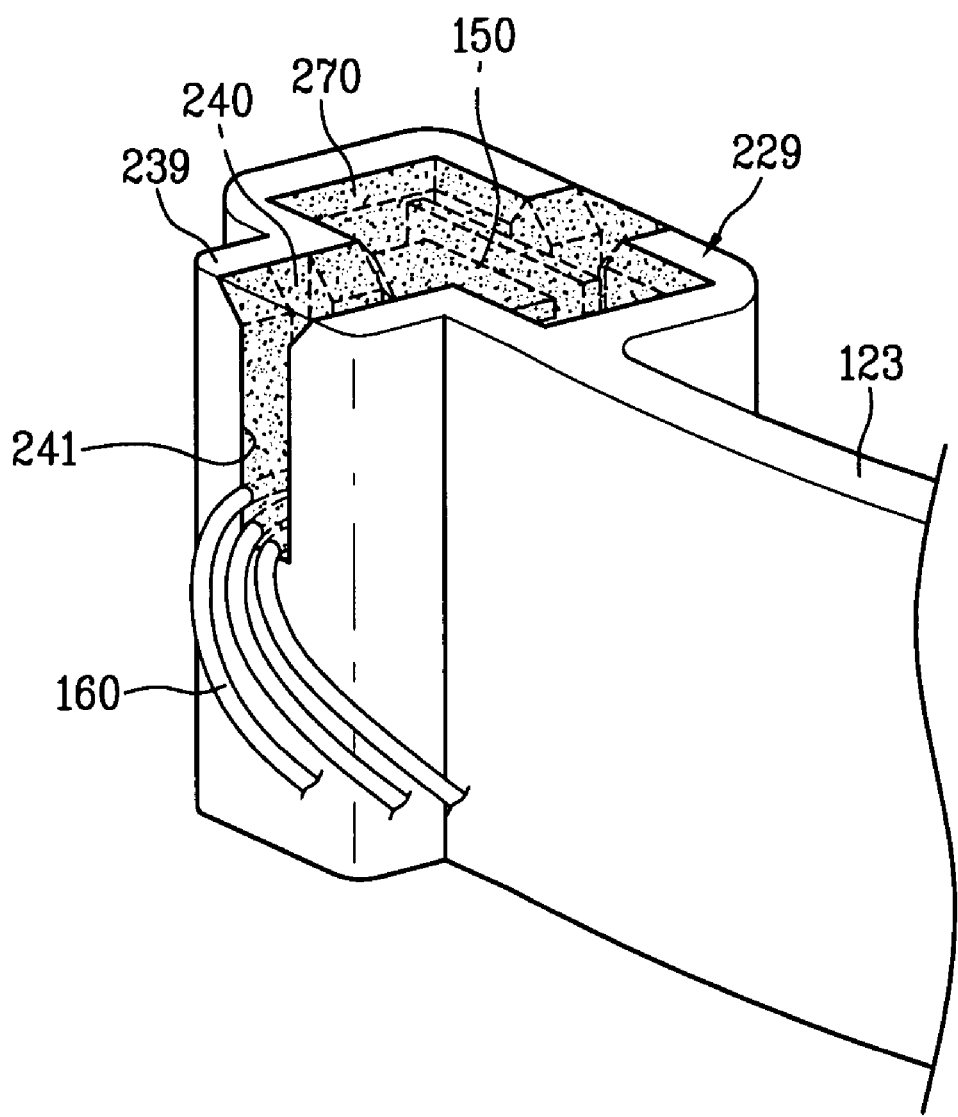
FIG. 9 is a perspective view illustrating an insulating portion in accordance with another preferred embodiment of the present invention.

Referring to FIG. 9, The insulating portion further includes a reinforcing portion 239 for reinforcing strength of the tap terminal.

The reinforcing portion 239 is formed on one side of the tap terminal. Specifically, the reinforcing portion 239 may be formed on an inside an outside of the tap terminal in a radial direction thereof. However, taking convenience of fastening an end of the coil into account, it is preferable that the reinforcing portion is formed on the outside of the tap terminal in the radial direction thereof. Like the tap terminal, it is preferable that the reinforcing portion is formed as one unit with the insulator.

For the tap terminal, it is preferable that the reinforcing portion 239 has a slot 241. According to this, the end of the coil is fastened both to the slot 241 in the reinforcing portion and the slot 162 in the tap terminal, thereby reinforcing fastening of the coil further.

Moreover, it is preferable that the slot 241 or 162 has a width in conformity with the outside diameter of the coil 160. It is preferable that the width of the slot 241 or 162 is formed smaller than the outside diameter of the coil 160 with the films coated thereon to a certain extent, so that the coil fits into the slots 241 and 162, and is fastened thereto, as well. However, it is more preferable that the width is not excessively small to prevent damage to the coated films.

The description of the width of the slot is applicable, not only to the embodiment, but also to foregoing other embodiments.

Along with this, it is preferable that the reinforcing portion 239 has a pocket 239 formed in a predetermined space in the reinforcing portion 230. It is preferable that the pocket is in communication with an inside of the tap terminal through the slot 162. Accordingly, the coil 160 crosses the pocket 239 and is fastened to the tap terminal.

Moreover, resin 270 may be coated as the insulating portion. In this case, it is not preferable that the resin coated on the top of the tap terminal overflows to an outside of the tap terminal. Therefore, it is preferable that the overflow, if any, is directed to the pocket 240 in the reinforcing portion 239, by means of which a fixed amount of the resin can be coated, permitting, not manual, but automatic coating of the resin, to simplify a production process.

Also, the coating of a larger area reinforces the end of the coil, secures insulation, and prevents corrosion of the end of the coil.

The resin 270 also may not be applied, when applying the tap terminal cover 180 in FIG. 8 instead. Of course, the tap terminal cover may be capped after the resin is coated.

In the present invention, because the winding is made following the path between adjacent coils, a height of the coil layers is lower than four times of the outside diameter of the coil even if four coil layers are formed. That is, as the winding is made closely, and a more secure winding can be made.

Also, the present invention discloses another coil slipping preventive structure besides the structure of the additional winding at opposite ends of the winding portion for filling the gaps.

Figure 11:
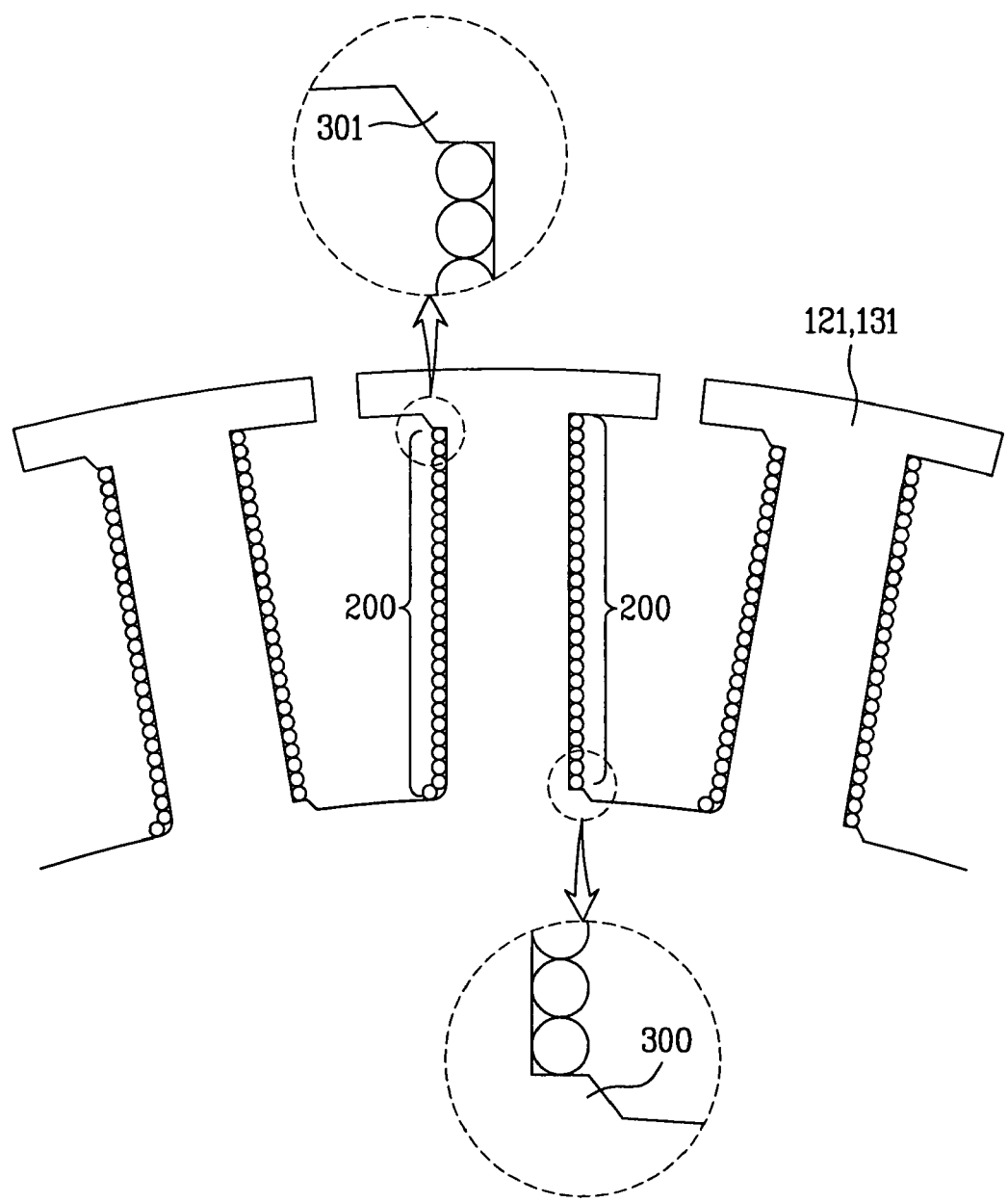
FIG. 11 is a partial plane view illustrating a coil slipping preventive structure in accordance with another preferred embodiment of the present invention.

Referring to FIG. 11, the coil slipping preventive structure may be a projection projected for reducing a length of the winding portion. That is, a projection is formed at opposite ends of the winding portion, preferably at a portion opposite to a portion where the winding starts and at a portion where the winding ends. The height of the projection reduces a length of the winding portion, and it is preferable that the projection is formed according to the outside diameter of the coil and a length of the winding portion such that no gap is formed between coils wound.

Also, if a length of the projection is greater than the outside diameter of the coil, there can be a case when one turn of winding can not be made. Accordingly, it is preferable that the length of the projection is smaller then the outside diameter of the coil.

Moreover, the projection may be projected, not in the length direction of the winding portion, but in a radial direction. That is, the projection may be formed at corners of the opposite ends of the winding portion. In this case, it is preferable that the projection length of radial projection is smaller than the outside diameter of the coil for preventing the projection from interfering winding of an overlying layer.

Therefore, a winding method with the projection may be the same with a related art winding method. However, the projection prevents the coil from slipping to minimize defective windings.

It is required to wind the coil such that damage to the coil is minimized at the time of winding because the coil of aluminum core is applied. That is, it is preferable that coil is wound moderately without sharp bending.

Figure 12:
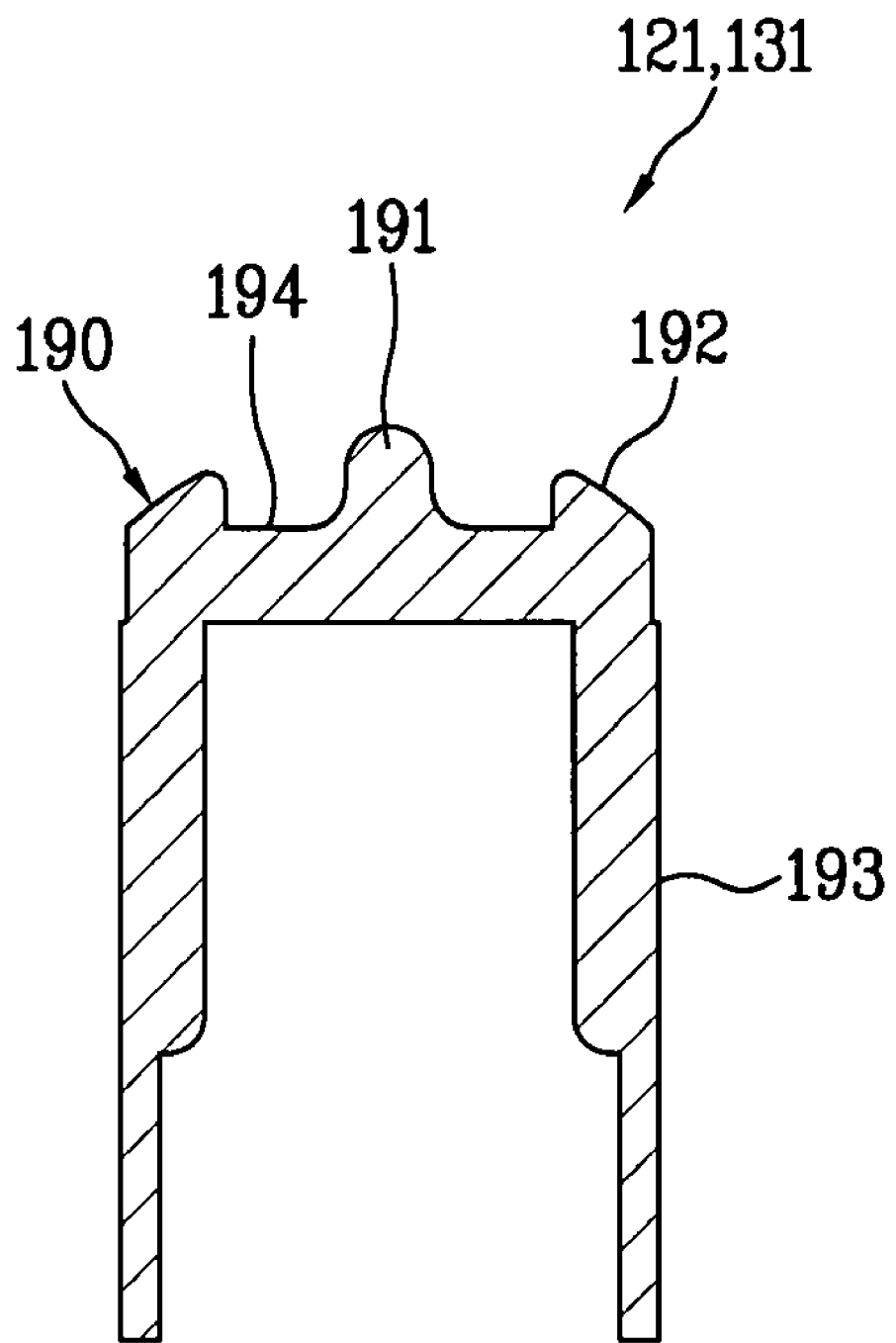
FIG. 12 illustrates a section across a line I-I in FIG. 1.

For this, a coil supporting portion is provided to the winding portion. FIG. 12 illustrates a section across a line I-I in FIG. 1, i.e., a section of the winding portion which is applicable both to the upper insulator and the lower insulator.

The coil is wound on the winding portion, the coil is wound, starting from a side to a top of the winding portion, and therefrom to a side thereof again. In this instance, at the time the coil is wound from the side to the top, the coil is liable to bend at 90 degrees sharply. In this case, the coil itself can be damaged, and there can be drop of efficiency due to an increased resistance coming from sharp change of a shape.

Therefore, it is preferable that the winding portion has a coil supporting portion at the top thereof for supporting the coil so that the coil is wound moderately.

In the meantime, the coil supporting portion may include a first coil supporting portion projected upward from opposite edges of the top, and a second coil supporting portion between the first coil supporting portion.

It is preferable that a height of projection of the second coil supporting portion is greater than a height of projection of the first coil supporting portion. By means of the coil supporting portion, the coil can be supported, so as to be wound moderately while the coil forms an arc.

It is preferable that the second coil supporting portion has a rounded fore end, for spreading an external force to minimize damage to the coil. This is applicable even with regard to the first coil supporting portion.

The present invention permits application of a coil of aluminum core wire. Moreover, the motor of the present invention includes an insulating portion for reinforcing, insulating, and corrosion prevention of the aluminum core wire.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A motor for driving a drum of a washing machine, the motor comprising:
   a stator having a stator core and an insulator provided to the stator core for winding a coil thereon;
   a rotor rotatably provided with respect to the stator;
   a tap terminal provided to the insulator for positioning an end of the coil, wherein the coil includes a core wire of aluminum and the end of the coil is fastened to the tap terminal through a magmate placed in the tap terminal such that the exposed core wire is connected to the magmate electrically; and
   resin coated on the tap terminal after the magmate and the end of the coil is placed in the tap terminal to prevent of corrosion of, and reinforce the exposed core wire of the end of the coil.

2. The motor of claim 1, wherein the end of the coil is electrically connected to the magmate at the time the magmate is placed in the tap terminal.

3. The motor of claim 1, wherein the coil further includes double films coated on an outside of the core wire.

4. The motor of claim 1, wherein the tap terminal is fabricated as one unit with the insulator.

5. The motor of claim 1, wherein the tap terminal is a power connection terminal or a neutral point tap terminal.

6. A motor for driving a drum of a washing machine, the motor comprising:
   an insulator provided to a stator core for winding a coil of aluminum core wire thereon, and insulating between the stator core and the coil;
   a tap terminal provided to the insulator for positioning an end of the coil thereto;
   a magmate placed in the tap terminal for exposing the core wire of the coil to connect to the coil electrically, and fastening the coil to the tap terminal; and
   an insulating portion formed at an exposed core wire portion of the coil and on the magmate exposed to an outside to prevent of corrosion of, and reinforce the exposed core wire portion, wherein the insulating portion includes a tap terminal cover of an insulating material to cover and isolate the space and the magmate from the outside.

7. The motor of claim 6, wherein the magmate and the tap terminal cover are fabricated as one unit.

8. The motor of claim 6, wherein the insulator includes a winding portion formed thereon for winding the coil thereon, and the winding portion includes a coil slipping preventive structure for the coils fall in on themselves, to set positions of the coils.

9. A motor for diving a drum of a washing machine, the motor comprising:
   a stator having a stator core and an insulator provided to the stator core for winding a coil thereon;
   a rotor rotatably provided to an outer side of the stator, the rotor having permanent magnets provided to an inside;
   a tap terminal provided to the insulator for positioning an end of the coil; and
   a reinforcing portion on one side of the tap terminal having a predetermined space therein and communicating to an inside the of the tap terminal and a slot to fasten the end of the coil, wherein, after the end of the coil is fastened to the tap terminal and the reinforcing portion such that the core wire of aluminum of the coil is exposed, resin is coated on the tap terminal to prevent corrosion of, and reinforce the end of the coil.

10. The motor of claim 9, wherein the resin coated on the top of the tap terminal overflows to the space of the reinforcing portion.

11. The motor of claim 9, wherein the core wire of the coil is exposed at the time magmate is placed in the tap terminal such that the exposed core wire is connected to the magmate, electrically.

* * * * *